Horace F. Thomas
James M. Adams
INVENTORS

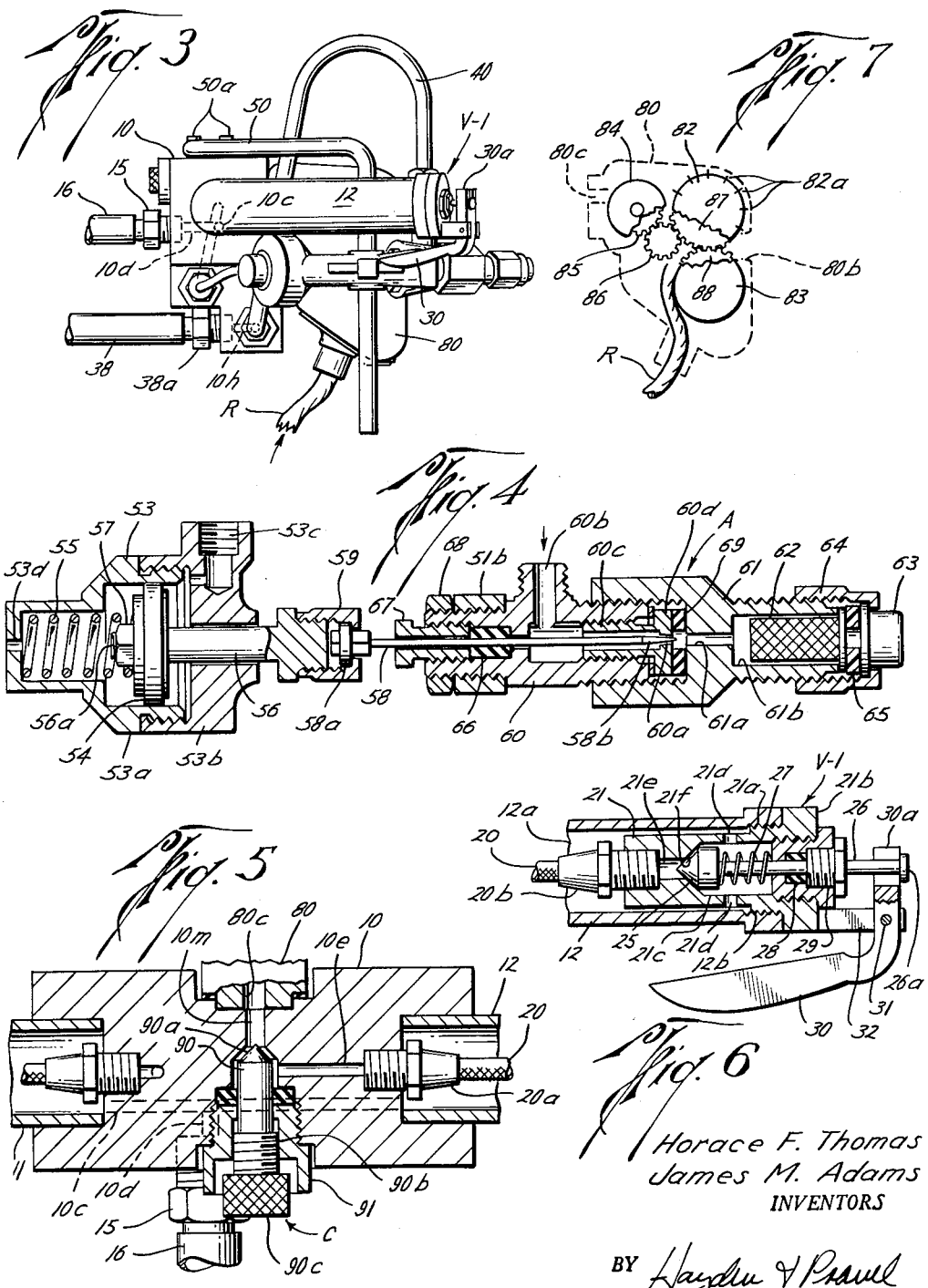

United States Patent Office 3,032,278
Patented May 1, 1962

3,032,278
APPARATUS FOR SPRAYING VISCOUS FLUIDS
Horace F. Thomas and James M. Adams, both of
P.O. Box 10262, Houston, Tex.
Filed June 8, 1960, Ser. No. 34,689
3 Claims. (Cl. 239—422)

This invention relates to an apparatus for spraying viscous fluids.

As is well known, certain types of resins such as epoxy resins must be mixed with a catalyst or promoter in order to obtain a hardening of the resin. Since the epoxy resins and the catalysts or promoters used therewith are relatively viscous fluids, the resin and the promoter have heretofore been mixed in buckets or similar containers by stirring with a paddle, which procedure is difficult and does not assure a good mixture of the two components. A mixing apparatus for satisfactorily accomplishing such mixture is disclosed in our copending United States patent application Serial No. 34,742, filed June 8, 1960.

Attempts have been made to separately spray the resin and the promoter onto a surface to be coated, but even with subsequent rubbing or working of such components on the surface, there is inadequate mixing which results in soft spots in the coating that do not harden. A method for obtaining an admixture of the resin and the promoter and for spraying them as a mixture onto a surface to be coated is disclosed in our copending United States patent application Serial No. 34,755, filed June 8, 1960.

It is an object of this invention to provide a new and improved spray apparatus which is particularly suitable for use in carrying out said method of said application Serial No. 34,755 and which is especially adapted for spraying the mixture of resin and catalyst or promoter supplied from said mixing apparatus of said application Serial No. 34,742.

An important object of this invention is to provide a new and improved spray device for spraying viscous fluids and the like from two or more spray nozzles which are adapted to direct their spray streams towards each other to form a common stream of substantial force and volume for applying a uniform coating on a surface.

Another object of this invention is to provide a new and improved spray apparatus for spraying a fluid such as a viscous resin and hardening promoter mixture in a spray stream towards a stream of small particles such as short glass fibers so as to combine such streams prior to, or at, a surface to be coated therewith, whereby the fluid is intimately dispersed with the particles for adhering the particles uniformly on the surface with the fluid.

A further object of this invention is to provide a new and improved spray apparatus having a pair of nozzles which are supplied with air or other operating fluid from a common source but which are independently operable.

Still another object of this invention is to provide a new and improved spray apparatus wherein each spray nozzle includes a valve which is operable by air or other fluid to open the valve for the discharge of another fluid from the nozzle.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 3 is a side view of the preferred form of the apparatus of this invention;

FIG. 4 is a cross-sectional view of one of the spray assemblies of this invention taken on line 4—4 of FIG. 1;

FIG. 5 is a sectional view of a portion of the apparatus of FIG. 1 to illustrate certain details thereof;

FIG. 6 is a sectional view illustrating the details of one of the valve means used with the preferred form of the invention; and FIG. 7 is a schematic view of one form of chopper mechanism for use with the spray assemblies.

Figure 1:
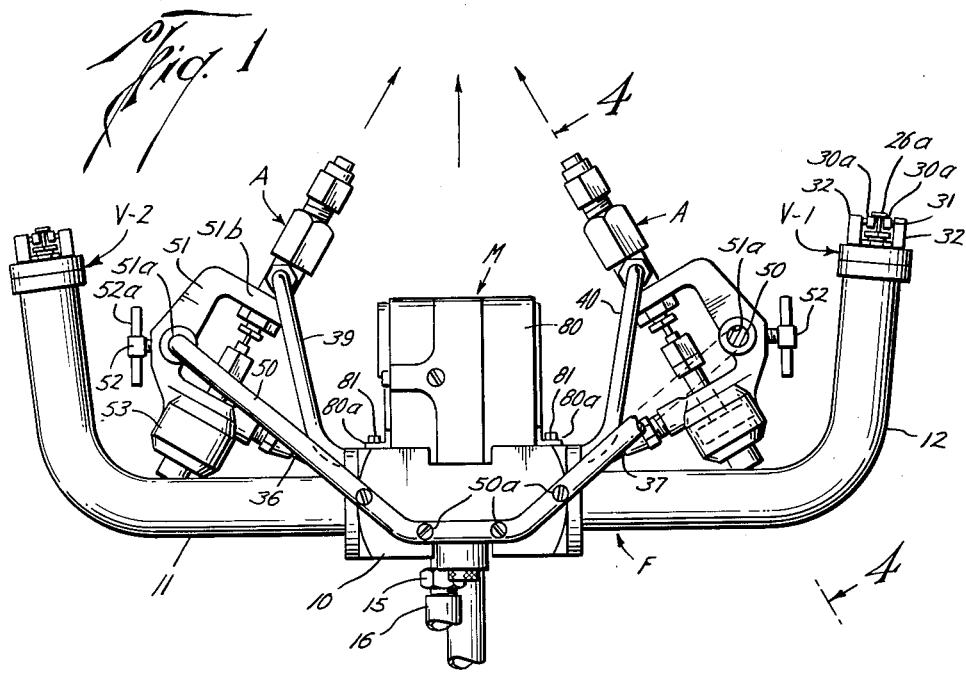
FIG. 1 is a plan view of the preferred form of the apparatus of this invention.
Figure 2:
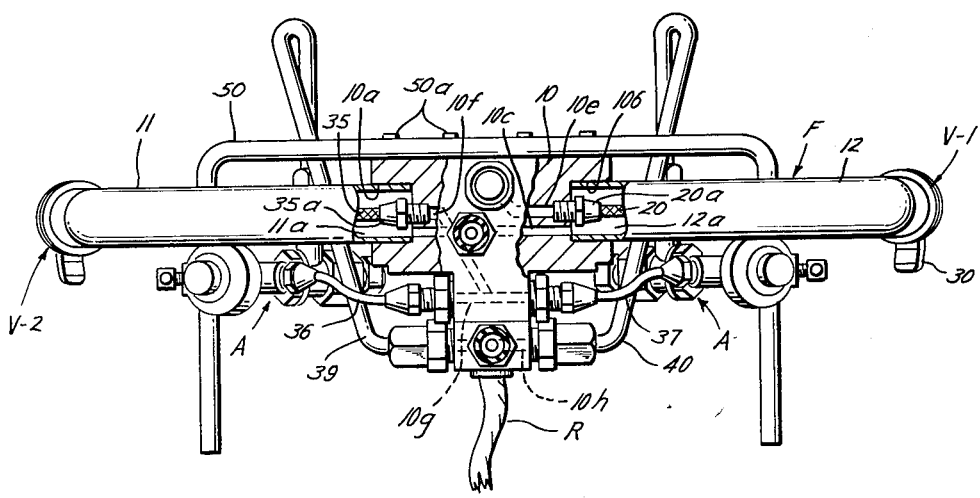
FIG. 2 is a view, partly in section and partly in elevation, illustrating further details of the invention.

In the drawings, the letter F designates generally the frame of the apparatus of this invention. Such frame F has one or more spray nozzle assemblies A mounted therewith for directing streams of coating fluid therefrom onto a surface to be coated. The apparatus of this invention also includes a means for chopping or cutting a fibrous material or the like into particles of short lengths or sizes, such mechanism being designated with the letter M. The spray nozzle assemblies A and the particle discharging mechanism M are both mounted on the frame F and are so constructed and connected, as will be explained in detail hereinafter, that an operating fluid is selectively directed to the nozzle assemblies A and the particle discharge mechanism M for selectively directing streams therefrom. In the preferred form of the invention, the particle discharge mechanism M is positioned at an intermediate point between the spray assemblies A (FIG. 1) so as to direct the streams from the mechanism M and the assemblies A to an intersecting area for obtaining an intimate mixing of the coating fluid from the assemblies A and the particles from the mechanism M for applying same uniformly to a surface to be coated.

Considering the invention more in detail, the frame F includes a frame header 10 which has tubular frame members 11 and 12 connected therewith. For convenience in handling the apparatus of this invention during the use thereof, the tubular frame members 12 are preferably bent so as to form substantially L shaped members which are adapted to be grasped by the hands of the user, as will be more evident hereinafter. The frame members 11 and 12 may be secured to the frame header 10 by any suitable securing means, but as shown in the drawings, the header 10 has recesses 10a and 10b into which the ends of the members 11 and 12, respectively, fit. The fit of the ends of such tubular members 11 and 12 with the header 10 should be a tight fit so that the interiors of the tubular members 11 and 12 form chambers for supplying air or other operating fluid to the spray assemblies A and the particle discharging mechanism M, as will be more fully explained.

Fluid communication is established between the tubular members 11 and 12 by a flow passage 10c in the header 10. The passage 10c is also in communication with a passage 10d extending laterally therefrom (FIGS. 3 and 5) to a threaded coupling 15 mounted on the header 10 for connecting a supply hose 16 to the header 10. Air or other operating fluid is thereby admitted through the supply hose 16 and the coupling 15 to the passage 10d for flow to the chambers within the tubular members 11 and 12 through the passage 10c.

A tube 20, preferably one that is flexible, is mounted within the interior or chamber 12a of the tubular member 12. A coupling 20a is attached to one end of the tube 20 for connecting the tube 20 to the header 10 for establishing fluid communication from the tube 20 through a passage 10e in the header 10. The other end of the tube 20 has a coupling 20b (FIG. 6) which is threaded or is otherwise connected to a valve housing 21 of a valve V-1 which is mounted in the end of the tubular member 12. The valve member V-1 may be mounted in the end of the tubular member 12 in any desired manner, but as shown in FIG. 6, the housing 21 has external threads 21a formed thereon which permit the threading of the housing 21 into threaded engagement with internal threads 12b at the end of the tubular member 12. A flange 21b limits the extent of the inward movement of the valve body 21. The valve V-1 has a valve chamber 21c within the valve body or housing 21 and it has one or more ports 21d which establish communication between the chamber 12a and the chamber 21c. A longitudinally extending bore or hole 21e extends through the valve body or housing 21 for establishing fluid communication between the interior of the tube 20 and the valve chamber 21c. A valve member 25 engages a valve seat 21f to close the communication between the passage or hole 21e and the valve chamber 21c. Such valve member 25 is mounted on a valve stem 26 for movement to and from its seated position shown in FIG. 6. A spring 27 acts to urge the valve member 25 to the seated position. The stem 26 passes through a packing 28 which is maintained in tight sealing engagement with the stem 26 by a packing gland nut 29. An operating handle 30 is pivotally mounted with a pivot pin 31 which extends through the handle 30 and a pair of projections 32 which extend from the flange 21b. The upper end of the handle 30 is bifurcated and the stem 26 extends through the opening between the spaced fork elements 30a. The stem 26 has a head 26a therewith which is of a larger diameter than the width of the space between the fork elements 30a so that as the handle 30 is pivoted so that the lower portion swings upwardly as viewed in FIG. 6, the stem 26 is pulled to the right to unseat the valve member 25 for permitting fluid flow from the valve chamber 21c into the hole 21e and thus to the tube 20. The spring 27 serves to return the valve member 25 to the seated position and also to return the valve handle 30 to the position shown in FIG. 6 after the handle 30 is released.

Within the chamber 11a of the tubular member 11, another tube 35 is positioned for establishing fluid flow from the chamber 11a through the valve V-2 to the header 10. The valve V-2 is identical with the valve V-1 and therefore the valve V-2 is not shown in detail in the drawings. The tube 35 has a coupling 35a connected to the header 10 for establishing fluid communication from the interior of the tubing or tube 35 to a flow passage 10f and then to a flow passage 10g which is in communication with the passage 10f. The flow passages 10f and 10g are also in fluid communication with flexible tubes 36 and 37 which extend to the spray assemblies A, as will be more apparent hereinafter.

For supplying the mixture of the epoxy resin and the catalyst or promoter to each of the spray assemblies A, the header 10 has a flow passage 10k which is in fluid communication with an inlet hose 38 which is coupled to the header 10 by a coupling 38a. The flow passage 10k in the header 10 is in fluid communication with flexible tubes 39 and 40 which extend to the spray assemblies A.

For mounting the spray assemblies A on the frame F, a mounting bracket 50 is connected to the header frame 10 by screws 50a or any other suitable securing means. Each of the spray assemblies A includes a mounting member 51 which is substantially U shaped and which has an opening 51a therethrough for receiving the downwardly extending end of the mounting bracket 50. A clamping screw 52 having a handle 52a thereon is threaded into the mounting member 51 for engagement with the external surface of the mounting bracket 50 to lock the mounting member 51 to the mounting bracket 50 at a predetermined point. When the clamping screw 52 is loosened so as to permit movement of the mounting member 51 on the bracket 50, then the mounting mmeber 51 may be moved vertically on the bracket 50 and may also be rotated with respect to the bracket 50. As will be explained, such movement of the mounting member 51 also effects a movement of the entire assembly A to thereby position the assembly A as desired. The locking or clamping screw 52 is of course tightened when the selected position has been obtained. Normally, the screws 52 are tightened when the assemblies A are so positioned that they direct their streams of coating fluid therefrom so as to intersect with each other as indicated in FIG. 1.

The bracket 51 has a sleeve 51b formed on one end thereof (FIGS. 1 and 4) and the other end of the mounting member 51 is connected to or is integral with a piston cylinder 53 which as shown in FIG. 4 is preferably made in two parts 53a and 53b.

A piston 54 is mounted in the cylinder 53 for longitudinal movement therein, and a spring 55 is also mounted in the cylinder 53 for urging the piston 54 to the right (as shown in FIG. 4). The section 53b of the piston cylinder 53 has a threaded opening 53c which is connected to the tube 36 for receiving air or other actuating fluid on the right side of the piston 54 as viewed in FIG. 4. Therefore, when the air or other actuating fluid under pressure is admitted into the cylinder 53 from the port 53c, the piston 54 moves to the left and overcomes the force of the spring 55. It is to be noted that a weep hole 53d is provided in the cylinder 53 for the release of air within the area of the spring 55 as the piston 54 moves to the left as viewed in FIG. 4. Upon a movement of the piston 54 to the right, the air pressure which is entrapped within the cylinder 53 is forced around the periphery of the piston 54 since it does not fit extremely tightly and therefore such released air pressure is also discharged through the weep hole 53d.

The piston 54 is mounted on a stem or shaft 56 which is connected to the piston 54 with a nut 57 on the threaded end 56a of the stem or shaft 56. The stem or shaft 56 is coupled at its other end to a valve stem 58 by any suitable means such as a releasable nut 59 which extends over an enlarged head or washer 58a on the stem 58. Therefore, the valve stem 58 moves with the piston 54.

The valve stem 58 extends into a valve body 60 and is adapted to engage a valve seat 60a for closing flow through the valve housing 60. An inlet passage 60b is provided in the valve housing 60 for admitting the resin-promoter mixture or other coating fluid from the line 39.

When the valve stem 58 is moved to the left as viewed in FIG. 4, the valve head 58b is unseated from the valve seat 60a so that the fluid from the passage 60b may flow through a passage 61a of a nozzle 61. The nozzle 61 has a cylindrical screen 62 mounted in a recess 61b for catching any large size pieces of resin or other material that might be in the line with the fluid. Such screen 62 prevents the particles from damaging or clogging the spray nozzle head 63 which is of any conventional construction and has an orifice therethrough to provide a relatively fine stream of the fluid discharging from the nozzle 61. The head 63 is removable and is held in position on the nozzle 61 by a retaining sleeve 64 which is threaded on the nozzle 61 as shown. A seal washer 65 is positioned between the nozzle head 63 and the screen 62 in the preferred form.

It is also to be noted that the stem 58 preferably passes through a packing 66 which is maintained in sealing contact with the external surface of the stem 58 by a packing gland or nut 67 which is threaded or is otherwise connected to the housing 60. Also, it should be noted that the sleeve 51b of the mounting member 51 is threaded on the housing 60 in the preferred form of the invention and a locking nut 68 is also threaded on the housing 60 to hold the sleeve 51b from movement. The seat 60a may be provided in the valve housing 60 in numerous ways, but as shown, such seat 60a is provided in a tube 60c which has a flange 60d therewith. The flange 60d is in contact with a seal washer 69 and is maintained in a tight position by the threaded engagement between the valve housing 60 and the nozzle 61 which are threaded together as shown in FIG. 4.

The particle discharge mechanism M is schematically illustrated in FIG. 7 of the drawings, and it will be appreciated that the particular construction of such mechanism M may be varied without departing from the scope of this invention. The housing 80 is mounted on the header 10 or any other suitable part of the frame F by any suitable means, but as illustrated, flanges 80a (FIG. 1) are provided through which bolts or screws 81 extend into the header 10 for holding the mechanism M on the frame F. Within the housing or casing 80, which may be of any suitable shape, the means for chopping a rope R of glass fibers or any other similar material is located. Such fiber rope R is fed between a cutting roller 82 and a back-up roller 83. The cutting roller has a plurality of radially extending blades 82a which are adapted to cut through the rope R when each blade 82a reaches a point in contact with the external surface of the roller 83. Preferably, the roller 83 is made of a relatively soft material such as rubber so that the roller 83 is not cut by the blades 82a. It is to be noted that intermediate the blades 82a, the rollers 82 and 83 frictionally engage the rope R sufficiently to pull same at a relatively rapid rate. By reason of such movement of the rollers 82 and 83 at a relatively rapid rate and the cutting of each of the blades 82a at predetermined intervals, the rope R is cut into relatively short fibers, normally approximately one inch to one and a half inches in length which is determined by the distance between adjacent blades 82a. Such fibers when chopped or cut into the short lengths are then sprayed or discharged rapidly at a high rate from the rollers 82 and 83 so as to form a stream of fibers or particles which exit at the opening 80b of the housing 80. As previously pointed out and as indicated in particular in FIG. 1 of the drawings, such stream of the fibers or particles intersects with the streams of the coating fluid coming from the spray assemblies A in the preferred form of the invention.

The rollers 82 and 83 may be driven by any suitable means, but in the present invention, the rollers are driven by a motor 84 which is air driven and is of any conventional construction. The motor 84 drives the rollers 82 and 83 through any suitable means such as gears 85, 86, 87 and 88 which are meshed together for rotating the roller 82 clockwise and the roller 83 counterclockwise as viewed in FIG. 7.

The motor 84 is supplied with air or other actuating fluid through any suitable openings such as 80c (FIGS. 5 and 7) which is aligned with flow passage 10m in the header 10. The flow passage 10m is in fluid communication with the flow passage 10e and therefore, the flow of the air or other actuating fluid to the discharge mechanism M is controlled by the actuating valve V-1, as previously pointed out. Additionally, a regulating valve C (FIG. 5) is interposed between the flow passages 10e and 10m for regulating or controlling the volume of the air flowing to the air motor 84 within the housing or casing 80. Such valve C includes a valve stem 90 which has a tapered end 90a thereon for restricting the sides of the opening between the passage 10e and the passage 10m as best seen in FIG. 5. The stem 90a has external threads 90b thereon for threading within a retaining connector 91. A knurled handle 90c is provided on the stem 90 for threading the stem 90 inwardly and outwardly to adjust the size of the opening between the passages 10e and 10m.

In the use of the apparatus of this invention, the coating fluid is preferably a mixture of one or more epoxy resins and a promoter or catalyst such as an aliphatic and/or aromatic amine. Normally, the resin will have a viscosity within a range of from about 800 centipoises to about 2000 centipoises. The amine will normally have a viscosity within the range of from about 250 centipoises to about 1200 centipoises. Prior to supplying such components to the apparatus of this invention, they are mixed together and normally the viscosity of the coating fluid mixture is in a range of from about 1000 centipoises to about 1200 centipoises. Although the invention is particularly adapted for fluids of such relatively high viscosities, it is to be understood that the invention is not limited to use with high viscosity fluids. In any event, the coating fluid is supplied to the spray assemblies A through the supply line 38 and the tubes 39 and 40. Each of the spray assemblies A is constructed as shown in FIG. 4 and as heretofore described. The assemblies A are mounted, preferably so as to direct the fluid streams therefrom at angles to intersect with each other. The coating, when used for applying on a surface would be directed with the apparatus of this invention so that the intersection area of the fluid streams from the assemblies A would be the point at which the surface to be coated is contacted by the fluid streams. However, the exact point at which the surface to be coated is contacted by the fluid streams will of course be regulated by the operator depending upon the area to be coated and the type of coating being applied. It should be noted that with the apparatus of this invention, the operator grasps the tubular elements 11 and 12 at their outer ends in the vicinity of the valves V-1 and V-2 so that he can direct the common fluid stream from the assemblies A to any point desired. The coating fluid is supplied through the line 38 to the assemblies A under pressure, but the coating fluid is not released from the assemblies A until the valve stem 58 is moved to the left (as viewed in FIG. 4) to open the flow passage from the valve housing 60 to the spray nozzle head 63. Such opening of the valve 58b to discharge the coating fluid is accomplished by admitting the air or other actuating fluid under pressure to the piston chamber 53 to move the piston 54 to the left as viewed in FIG. 4. The air under pressure is admitted as desired by opening the valve member 25 (FIG. 6) which is accomplished by squeezing the handle 30 upwardly on the valve V-2. Since the valve V-2 controls the supply of air to both of the spray assemblies A, the opening of the valve member 25 in the valve V-2 causes a discharge of the coating fluid from both of the assemblies A at the same time.

The discharge of the particles or fibrous material from the discharge mechanism M is controlled by the opening of the valve V-1. When such valve V-1 is opened, then the air or other actuating fluid is supplied to the mechanism M to spray or discharge the short fibrous material therefrom onto the surface to be coated. Such fibrous material is preferably sprayed so as to direct a stream of the fibers to the area of intersection of the coating fluid streams from the assemblies A and thereby the fibrous material is intimately mixed and coated with the coating fluid to form a mat of the fibers intermixed with the coating fluid. For that reason, the mechanism M is normally positioned intermediate the assemblies A.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A spray apparatus comprising, a frame including a frame header and a tubular frame member connected to each side of said header, a spray nozzle assembly for spraying a viscous fluid or the like therefrom in a fluid stream, means for mounting said spray nozzle assembly on said frame, a particle spraying mechanism for spraying fibrous particles therefrom in a particle stream, means for mounting said particle spraying mechanism on said frame, said particle spraying mechanism including an air motor to actuate said mechanism and discharge said particles, a fluid passage through said header establishing fluid communication between said tubular frame members for introducing operating fluid from externally of said header in to each of said tubular frame members, a first air conductor means within and extending through one of said tubular frame members and extending to said spray nozzle assembly for establishing fluid communication therebetween, a valve adjacent the end of said tubular frame member and connected with said fluid conductor means for selectively supplying operating air therethrough, a second air conductor means within and extending through the other of said tubular frame members and extending to said particle spraying mechanism, and a valve adjacent the end of said other tubular frame member and connected with said second fluid control means for selectively supplying operating air therethrough to actuate said air motor of said particle spraying mechanism.

2. Apparatus for spraying viscous fluids comprising, a frame, said frame including a header, tubular L-shaped members having one end secured to said header and forming handle means to be grasped by the user of the spraying apparatus, air valve means mounted in the other end of said tubular members, valve actuating handle means adjacent each of said tubular handle means for actuating said valve means, inlet air conducting passage means in said header for communicating air to said tubular handle means, discharge conduits connected from each of said air valve means and extending through said tubular handle means back to said header, fluid spray nozzles supported on said frame, means for supplying fluid to said nozzles to be discharged therefrom, said spray nozzles including a valve arrangement which is air operated, said valve arrangement having a cylinder and a piston therein movable in response to air pressure to open said spray nozzles, passage means in said header and communicating with said piston and cylinder for supplying air from said air discharge conduits to said cylinder and piston to open said spray nozzles, said spray nozzles and said air valve means each normally closed, and said air valve means opening when said valve actuating handle means are depressed whereby air is supplied from said tubular handle means through said discharge conduit in said tubular handles to said header and then to said cylinder and piston to open said spray nozzles whereby said fluid supplied to said nozzles is discharged therefrom.

3. The invention recited in claim 1 wherein said tubular frame members are L-shaped and face in the same general direction as said spray nozzle assemblies whereby the direction of the spray can be guided by grasping said tubular frame members.

References Cited in the file of this patent

UNITED STATES PATENTS

| | | |
|---|---|---|
| 1,881,345 | Beatty et al. | Oct. 4, 1932 |
| 2,059,706 | Paasche | Nov. 3, 1936 |
| 2,787,314 | Anderson | Apr. 2, 1957 |
| 2,850,421 | Thompson | Sept. 2, 1958 |
| 2,860,687 | Cole | Nov. 18, 1958 |
| 2,929,436 | Hampshire | Mar. 22, 1960 |
| 2,933,125 | Anderson | Apr. 19, 1960 |

FOREIGN PATENTS

| | | |
|---|---|---|
| 560,254 | Italy | October 1958 |